Nov. 5, 1946.  G. B. KESTER  2,410,543
SNOW PLOW
Filed June 22, 1942  2 Sheets-Sheet 1
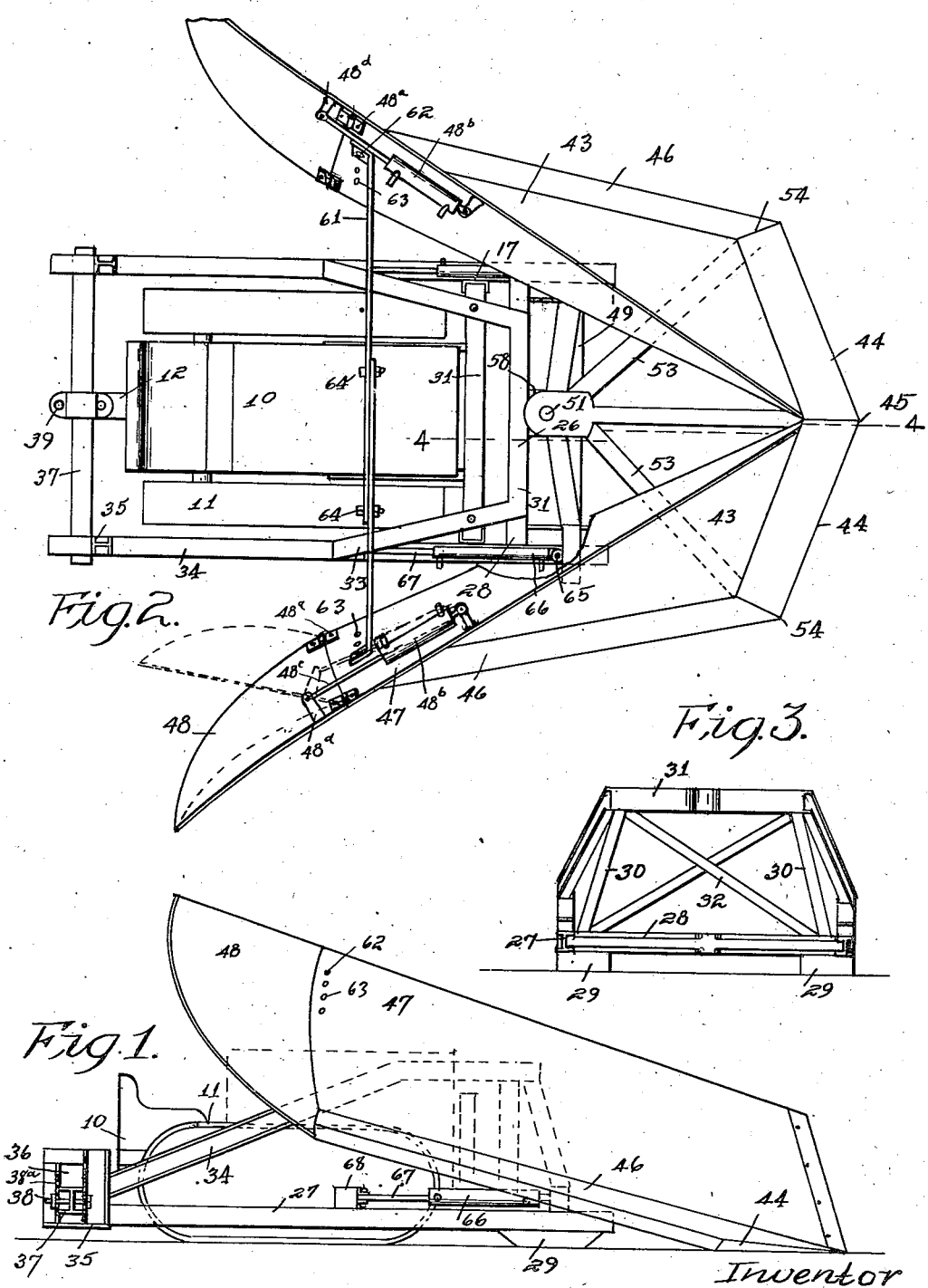
Inventor
George B. Kester Nov. 5, 1946.　　　　G. B. KESTER　　　　2,410,543
SNOW PLOW
Filed June 22, 1942　　　　2 Sheets-Sheet 2
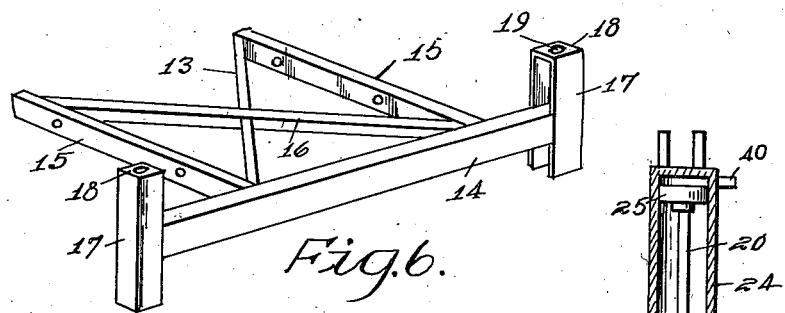
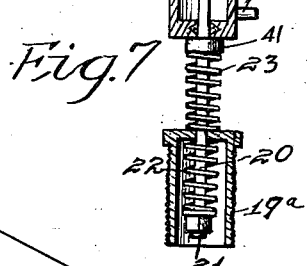
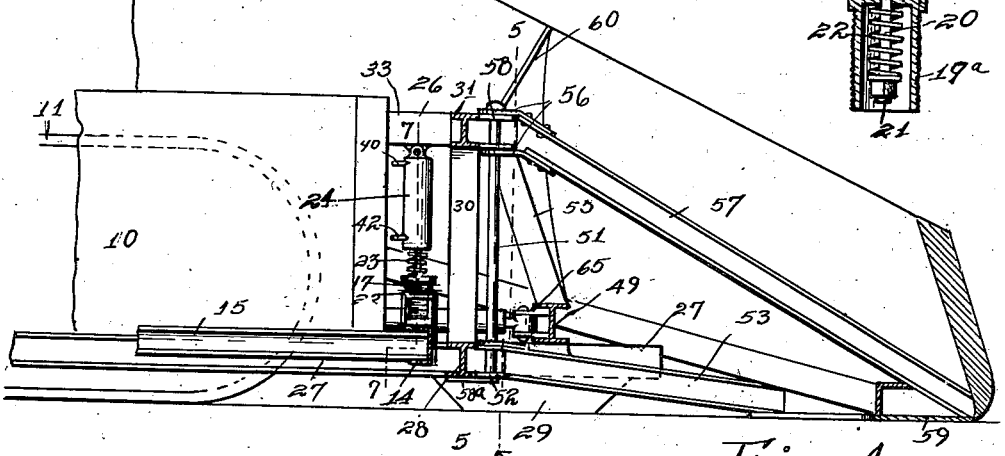
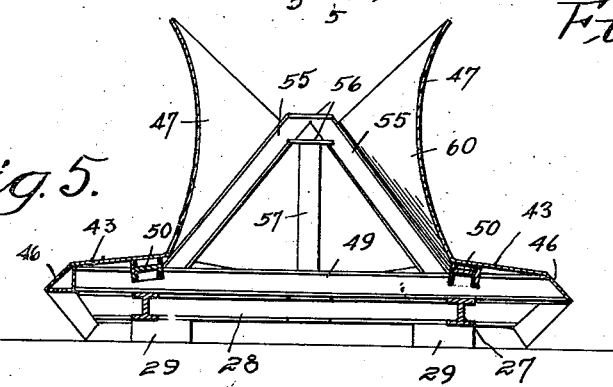
Inventor
George B. Kester
Orwig & Hague,
Attys Patented Nov. 5, 1946

2,410,543

UNITED STATES PATENT OFFICE 2,410,543

SNOW PLOW

George Benjamin Kester, Tingley, Iowa

Application June 22, 1942, Serial No. 447,959

8 Claims. (Cl. 37—44)

This invention relates to an improved snow plow of the type adapted to be carried by a tractor or similar self-propelled vehicle and employing a pair of converging blades adapted to be moved in advance of the tractor. One difficulty encountered in the employment of the above described type of plow is in the fact that as the plow is advanced through a snow drift, the snow is pushed laterally causing it to be packed to such an extent that a large amount of power is necessary to operate the plow and oftentimes it is impossible, with the available power at hand, to force the plow through the drift.

It is the object of my invention to provide a snow plow of the type adapted to be carried by a tractor and advanced ahead of the tractor, and to provide therein means wherein a path of a width somewhat in excess of the width of the tractor may be made in a single operation, and in connection therewith means whereby the snow is elevated as the tractor is advanced, to a point substantially near or above the top of the drift, after which it is moved laterally and outwardly to prevent the packing effect above described.

A further object of my invention is to provide a snow plow having converging blades so constructed and arranged that the tractor may be supported back of the forward end and between the rear ends of the blades, and in connection therewith improved means for supporting and controlling the plow.

A further object is to provide a snow plow of the type above described, of simple, durable and inexpensive construction which may be easily and quickly attached to the ordinary tractor.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved snow plow showing the manner in which it is attached to a tractor;

Figure 2 is a plan view of the same;

Figure 3 is a front end elevation of the main frame, with the plow detached;

Figure 4 is an enlarged detail sectional view taken on the line 4—4 of Figure 2;

Figure 5 is a vertical sectional view taken on the line 5—5 of Figure 4;

Figure 6 is a perspective view of the auxiliary frame carried by the tractor for the purpose of guiding and supporting the main frame; and Figure 7 is a detail sectional view taken on the line 7—7 of Figure 4.

On the drawings I have used the reference numeral 10 to indicate a tractor, preferably of the type employing treads 11, having a hitch bar 12.

Detachably connected to the under frame of the tractor 10 is what I shall term a supporting and guiding frame 13, comprising a transversely arranged bar 14 and two forwardly and rearwardly extending bars 15, adapted to be bolted to the frame of the tractor, braces 16 being provided between the members 15 and the member 14. Each end of the member 14 is provided with upright guides 17, preferably in the form of channel irons having a plate 18 closing their upper ends, each of said plates being provided with a screw-threaded opening 19 in which is mounted a threaded sleeve 19a, in which is mounted a vertical rod 20 having its lower end extending into the sleeve 19a and provided with a nut 21 on which is mounted a spring 22, a spring 23 being carried on the upper surface of the sleeve 19a and against the lower end of a collar 41. A piston 25 is mounted in a cylinder 24 and connected to the upper end of the rod 20, the upper end of the cylinder being adapted to support the forward end of the main frame 26, said main frame 26 comprising a pair of horizontally arranged bars 27 having their forward ends connected by a transversely arranged bar 28, said bar being supported ahead of the member 14 and ahead of the tractor, the forward ends of the bars 27 being provided with runners or skids 29 designed to rest on the ground surface. The bar 28 is provided with upright and slightly inclined posts 30 (see Fig. 3) having at their upper ends a cross bar 31, braces 32 being provided for supporting said members in a rigid manner. The outer end of the bar 31 is provided with rearwardly and outwardly extending frame portions 33, having their rear ends terminating in downwardly extending portions 34, the rear ends of the members 27 and 34 being connected to a frame portion 35 having an opening 36 for receiving a cross beam 37, said beam being detachably and adjustably secured therein by means of bolts 38. The central portion of the beam 37 is provided with a clamp 39 adapted to be connected to the draft bar 12 in a detachable manner, the bar 37 serving to provide means for imparting forward movement to the main frame 26 and at the same time provide means for carrying the weight of the rear ends of the frame members 27, the weight of the forward ends of the said frame being carried by the runners 29. The members 17 are in slidable connection with the inner faces of the members 27 to permit the said members 27 to move upwardly and downwardly, the said members 17 serving also to provide means for guiding the forward end of the main frame laterally as the tractor is steered either to the right or left.

By connecting the upper ends of the cylinders 24 to the under side of the members 33 I have provided means whereby the forward end of the main frame may be elevated and lowered by means of the piston 25 controlled by fluid under pressure, such as oil, the cylinder 24 being elevated by simply permitting oil to enter the upper end of the cylinder through the pipe 40 by any suitable means, not illustrated. Downward pressure will then be applied to the piston 25, and in turn to the collar 41 and to the upper end of the spring 23, which in turn rests on the upper end of the sleeve 19a, the spring 23 providing means for yieldably supporting the front end of the main frame when in its elevated position, and also prevents the tendency of the front end of the tractor to elevate due to its torque under load.

Sometimes it is desired to support the main frame against upward movement, in which case fluid enters the cylinder 24 through the pipe 42. Tension will then be applied to the spring 22 and lifting strain applied to the frame 14 and the forward end of the tractor. By this means the weight of the tractor may be added to the weight of the main frame and also to the plow, hereinafter to be described, which is carried by said main frame.

The plow comprises a pair of converging blades 43 having their front and lower ends supported substantially horizontal and their front edges provided with beveled portions 44 inclined rearwardly and outwardly from the central point 45, and the outer edge provided with beveled edges 46, the rear end of the portions 43 and 46 terminating in an elevation substantially equal to the height of the average snow drift, the inner edges of the members 43 terminating in upwardly and outwardly curved flanged portions 47 having at their rear ends outwardly flanged portions 48. The members 43 and 46 are supported by a transversely arranged bar 49 and longitudinally arranged beams 50, the beam 49 being carried by the forward ends of the members 27 and having its central portion pivotally connected to an upright shaft 51 by means of flanges 52 carried by the rear ends of diagonally arranged beams 53 having their forward ends connected to the members 44 and 46 at their adjoining ends 54, the beam 49 being attached to and resting on the members 53, the beam 49 also being provided with upwardly and inwardly inclined members 55 connected at their upper ends with rearwardly extending plates 56 which are in turn pivotally connected to the upper end of the member 51. A beam 57 has its upper end also connected with the members 56 and its lower end terminating in the pointed ends of the members 44. The pivot 51 is carried by flanges 58 attached to the central portion of the beam 31 and by flanges 58a supported by the central portion of the beam 28. The points 45 and 54 of the plow are provided with plates 59 which serve as shoes for the forward end of the plow. The members 55 are each provided with a plate 60 projecting outwardly and connecting to the inner surface of the flanged portions 47 of the blades, which serves as a means for bracing the blades. The rear ends of the members 47 are provided with a cross brace 61 which is secured to said blades in an adjustable manner by means of bolts 62 and openings 63, said braces 61 having their inner ends overlapping and adjustably connected by means of bolts 64, the bolts 62 providing means whereby the height of the brace may be adjusted by placing said bolts in various ones of the openings 63. This provides means for accommodating tractors of various heights, the end of the brace being adjusted to accommodate the curvature of the members 47 when the brace is carried at various elevations.

By this construction it will be seen that I have provided a unitary plow element having its weight carried by the beam 49, the ends of which rest on the forward ends of the beams 27 in a slidable manner so as to permit pivotal movement of the plow about the pivot member 51, said pivot member being supported substantially midway between the front and rear ends of the blades so that the inward pressure applied to the forward ends of the blades toward each other is somewhat counterbalanced by the inward pressure applied to the rear ends of the blades as the plow is advanced through a snow drift, so that a more or less balanced condition exists between the back and front ends of the plow, so far as lateral movement of the forward end of the plow is concerned, the back side of the ends of the beam 49 being provided with flanges 65 to which hydraulic cylinders 66 are attached, each cylinder having a piston rod 67 pivotally mounted in the bracket 68 supported by the corresponding beam 27. By applying a fluid to either the forward or rearward ends of the said cylinders the beam 49 may be rocked and the forward end of the plow moved either to the right or to the left, the distance between the portions 54 being greater than the width of the tractor, so that a path equal to this distance may be cleared by the forward edges of the members 44, the snow thus gathered being forced rearwardly on to the forward ends of the members 43 and upwardly and outwardly towards the rear ends of said members, and finally against the outer faces of the flanged portions 47 and 48, and moved outwardly over the top of the drift, the weight and downward pressure applied to the members 43 being carried by the shoes 59 and the runners 29, by means of the beam 49, so that in actual operation the tractor frame is relieved of said weight except at such times as is desired for raising and lowering the plow or for holding the forward end of the tractor down, which is accomplished by means of the cylinders 24 above described, the cylinders 66 serving to steer the plow relative to the tractor, while the beam 37 serves for carrying the weight of the frame and for imparting forward movement to the main frame, and in turn to the plow, the beam 37 being detachably mounted so that the tractor may be easily removed by simply backing it out between the rear ends of the members 27, or said tractor may be easily placed in position by simply driving between the said beams 27, then placing the beam 37 in position and attaching it to the draw bar 12.

Thus it will be seen I have provide a snow plow having diverging blades adapted to be advanced ahead of the tractor and terminating near the rear end of the tractor so that the power from the tractor may be applied to the plow by means of the main frame to a point substantially midway between the front and back ends of the plow, so as to stabilize the tendency of the plow to move laterally as it is advanced through the snow, the blades being so constructed that the strip of snow being cleared away may first be elevated to a point substantially near the top of the drift and then afterwards shoved outwardly to prevent packing of the snow in the drift, and thereby provide means whereby the plow may be advanced with considerably less power than has been heretofore possible with that type of snow plow being used in front of the tractor.

The threaded sleeve 19a provides means whereby the main frame may be adjusted relative to the tractor to compensate for any variation in height of the tractor due to the application or removal of mud or snow lugs to the tractor tread, this adjustment being accomplished by simply elevating or lowering the sleeve 19a in the plate 18, thereby lifting or lowering the cylinder 24, the rear ends of the frame members 27 being elevated and lowered correspondingly by means of the bolts 38 in the openings 38a, as shown in Fig. 1. The flanged portions 48 are pivotally mounted on the rear ends of the members 47 by means of hinges 48a to provide means whereby the said portions 48 may be swung inwardly to decrease the width of the plow when moving the same from one point to another and to permit the same to be passed through narrow gates and over bridges having overhead structures. For actuating the said members 48 I have provided inside of each of the members 47 a hydraulic cylinder 48b, having a piston rod 48c connected to a bracket 48d, so arranged that as the inner end of the bracket 48d is moved forwardly and rearwardly, the free end of the member 48 will be swung inwardly and outwardly. By means of suitable valves the member 48 may be locked in any one of its movable positions by simply preventing the flow of liquid to or from said cylinder 48b.

I claim as my invention:

1. The combination of a tractor, a supporting and guiding frame fixed to said tractor having an upright guide at each end near the forward end of said tractor, a main frame surrounding said tractor and said upright guides, means pivotally supporting the rear end of said main frame to the tractor draw bar, portable means supporting the forward end of said main frame, a unitary plow structure comprising converging blades, having its apex end terminating in front of said tractor and main frame, the back ends of the blades terminating near the back end of said tractor, with the tractor between them, means pivotally connecting the central portion of said plow structure to and on the forward end of said main frame, means for imparting pivotal movement to said plow structure about a vertical axis, and means carried by said guiding frame for elevating and lowering the forward end of the main frame and said plow structure.

2. The combination of a tractor, a main frame surrounding the tractor, pivot means supporting the rear end of the main frame by the tractor draw bar, ground-engaging means for supporting the forward end of said frame, a plow comprising a pair of converging blades, means pivotally supporting the central portion of said plow on the front end of said main frame, means carried by said main frame for imparting lateral swinging movement to the forward end of said plow, and means carried by the tractor frame for elevating and lowering the forward end of said frame and said plow.

3. The combination of a movable frame, means for imparting forward movement to said frame, a snow plow including converging blades having their forward edges substantially horizontal and adapted to engage the ground surface, said blades being inclined upwardly and rearwardly and outwardly, terminating a considerable distance above the ground surface, the rear ends and inner edges of said blades terminating in upwardly and outwardly curved portions wherein snow gathered by the forward edges of said blades will be first moved upwardly and outwardly and elevated to a point substantially above a drift, and thence moved outwardly to position beyond the edges of the excavated portions of said drift, means for pivotally connecting said plow to the forward end of said frame at a point substantially midway between its forward and back ends, and means for swinging said plow on said pivot to permit its forward ends to move laterally relative to its line of advance.

4. In a snow plow, a main frame, a plow unit comprising converging blades having their lower and forward ends terminating in horizontal portions adapted to engage the ground surface, the forward edges of said horizontal portions being inclined outwardly and rearwardly from their central point, said blades being inclined upwardly and rearwardly, having their inner edges curved upwardly and outwardly and their rear ends again curved outwardly, a transverse beam connecting the outer edges of the upwardly inclined portions of said blades substantially midway between their forward and rear ends, upwardly and inwardly inclined braces from the outer ends of said beams terminating at their top ends in a pivot member, the central portion of said transverse beam also being provided with a pivot member, a supporting frame, a pivot carried by the forward end of said main frame pivotally receiving the above said upper and lower pivot members, means carried by said main frame for steering said plow member about said pivot, and means for imparting forward movement to said main frame.

5. The combination of a tractor frame, a main frame, means pivotally connecting a rear portion of the main frame to said tractor frame, means supporting the forward end of said main frame, a plow comprising a pair of converging blades, means pivotally supporting the central portion of the plow adjacent the front end of said main frame to swing about a vertical axis, means carried by said main frame for imparting lateral swinging movement to the forward end of said plow, and means carried by the tractor frame for elevating and lowering the forward end of said main frame and said plow.

6. In snow plow apparatus, a main frame comprising a pair of supporting beams spaced apart to receive between them a tractor, a first upright transverse frame connecting said supporting beams adjacent their forward ends and forwardly of said tractor, the forwardly extending ends of said beams providing plow supporting portions, means detachably connecting the rear ends of said supporting beams with a rear portion of the tractor, portable means supporting the forward end of each supporting beam, a plow having upright blades diverging outwardly and rearwardly from their forward ends, a second transverse and upright frame positioned forwardly of said first upright frame and connected between said blades at portions intermediate their front and rear ends, the lower end of said second transverse frame including a transverse beam having its ends slidably supported on said plow-supporting portions, and means pivotally supporting said second upright frame on said first upright frame to permit the forward end of said plow to swing transversely about a vertical axis.

7. Snow plow apparatus for a tractor including a main frame comprising a pair of spaced supporting beams, ground-contacting means supporting the forward ends of said beams, a first upright transverse frame connecting said beams with portions of said beams extending forwardly thereof, a snow plow comprising a pair of upright blades diverging rearwardly from their common front edge, a second upright transverse frame supported between said blades at portions intermediate their front and rear ends, the outer ends of said second transverse frame being slidably supported on the forwardly extending portions of said beams, with the second transverse frame spaced forwardly of the first transverse frame, common means pivotally connecting together corresponding upper and lower ends of said first and second transverse frames to provide for a swinging movement of the forward end of said plow about a vertical axis, and means for pivotally connecting the rear portions of said supporting beams to a tractor frame.

8. A snow plow apparatus comprising a main portable frame including a pair of spaced longitudinal frame members, a first upright transverse frame connecting said frame members adjacent their forward ends, with each of said frame members having a front portion extended forwardly of said first upright frame, a plow unit including upright blades diverging rearwardly from a common front edge, and a second upright frame connected between said blades, with said second upright frame spaced forwardly of said first upright frame and movably supported on said front portions, and means pivotally supporting said second upright frame on said first upright frame to provide for a swinging movement of said common front edge transversely of said portable frame.

GEORGE BENJAMIN KESTER.